(12) United States Patent
Takakura

(10) Patent No.: US 10,487,905 B2
(45) Date of Patent: Nov. 26, 2019

(54) ANTI-VIBRATION DEVICE

(71) Applicant: BRIDGESTONE CORPORATION, Tokyo (JP)

(72) Inventor: Tomoki Takakura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 108 days.

(21) Appl. No.: 15/569,242

(22) PCT Filed: Feb. 24, 2016

(86) PCT No.: PCT/JP2016/000990
§ 371 (c)(1),
(2) Date: Oct. 25, 2017

(87) PCT Pub. No.: WO2016/174800
PCT Pub. Date: Nov. 3, 2016

(65) Prior Publication Data
US 2018/0320754 A1  Nov. 8, 2018

(30) Foreign Application Priority Data

Apr. 27, 2015 (JP) ................. 2015-090505

(51) Int. Cl.
*F16F 13/10* (2006.01)
*B60K 5/12* (2006.01)

(52) U.S. Cl.
CPC .......... *F16F 13/105* (2013.01); *B60K 5/1208* (2013.01); *F16F 13/10* (2013.01); *F16F 2222/12* (2013.01); *F16F 2232/08* (2013.01); *F16F 2236/04* (2013.01); *F16F 2238/04* (2013.01)

(58) Field of Classification Search
CPC .. F16F 13/105; F16F 2222/12; F16F 2232/08; F16F 2236/04; F16F 2238/04; B60K 5/1208
See application file for complete search history.

(56) References Cited

U.S. PATENT DOCUMENTS

| 5,340,093 | A | 8/1994 | Rudolph |
| 2001/0004141 | A1 | 6/2001 | Shimoda et al. |

(Continued)

FOREIGN PATENT DOCUMENTS

| CN | 1702348 A | 11/2005 |
| CN | 201090655 Y | 7/2008 |

(Continued)

OTHER PUBLICATIONS

International Search Report of PCT/JP2016/000990 dated Apr. 12, 2016.

(Continued)

*Primary Examiner* — Vishal R Sahni
(74) *Attorney, Agent, or Firm* — Sughrue Mion, PLLC

(57) ABSTRACT

An anti-vibration device (1) includes a tubular first attachment member (10), a second attachment member (20), an elastic body (70), and a separating member (50) that separates a liquid chamber in the first attachment member into a main liquid chamber (80) and a secondary liquid chamber (90). A membrane is held by the separating member, and the membrane and a diaphragm are formed integrally.

1 Claim, 3 Drawing Sheets

(56) References Cited

U.S. PATENT DOCUMENTS

| | | |
|---|---|---|
| 2005/0258581 A1 | 11/2005 | Tanaka |
| 2011/0031663 A1 | 2/2011 | Matsuda |
| 2013/0154171 A1 | 6/2013 | Nishi et al. |
| 2016/0160956 A1* | 6/2016 | Ueki ............... F16F 13/107 267/140.13 |
| 2016/0298716 A1* | 10/2016 | Ueki ............... F16F 13/107 |
| 2017/0023091 A1* | 1/2017 | Ueki ............... F16F 13/10 |
| 2017/0037924 A1* | 2/2017 | Ueki ............... F16F 13/10 |

FOREIGN PATENT DOCUMENTS

| | | |
|---|---|---|
| CN | 103161875 A | 6/2013 |
| DE | 102009003809 | * 10/2010 |
| DE | 102009003809 A1 | 10/2010 |
| EP | 0527302 A1 | 2/1993 |
| EP | 1188951 A2 | 3/2002 |
| JP | 06-337035 A | 12/1994 |
| JP | 11-236938 A | 8/1999 |
| JP | 2001-165231 A | 6/2001 |
| JP | 2004-251431 A | 9/2004 |
| JP | 2009-092137 A | 4/2009 |
| JP | 2009-250332 A | 10/2009 |
| JP | 2010-078017 A | 4/2010 |

OTHER PUBLICATIONS

Communication dated Apr. 10, 2018, from the European Patent Office in counterpart European Application No. 16786082.4.
Communication dated Sep. 29, 2018, from the State Intellectual Property Office of State Intellectual Property Office of People's Republic of China in counterpart Chinese Application No. 201680023876.5.

* cited by examiner

ANTI-VIBRATION DEVICE

CROSS REFERENCE TO RELATED APPLICATIONS

This application is a National Stage of International Application No. PCT/JP2016/000990 filed Feb. 24, 2016, claiming priority based on Japanese Patent Application No. 2015-090505 filed Apr. 27, 2015, the contents of all of which are incorporated herein by reference in their entirety.

TECHNICAL FIELD

The present disclosure relates to a liquid-filled type anti-vibration device used, for example, as an engine mount of a vehicle.

BACKGROUND

One type of conventional anti-vibration device includes a separating member that separates a liquid-filled liquid chamber inside a tubular attachment member (second attachment member) into a main liquid chamber and a secondary liquid chamber partitioned at least by a diaphragm. A membrane (movable plate) is stored in a storage chamber inside the separating member (for example, see patent literature PTL 1).

CITATION LIST

Patent Literature

PTL 1: JP 2009-92137 A

SUMMARY

Technical Problem

Since the membrane and the diaphragm are formed as separate members in the anti-vibration device of PTL 1, the membrane and the diaphragm need to be prepared as separate components during manufacturing of the anti-vibration device, leaving room for improvement in terms of cost.

It would therefore be helpful to provide an anti-vibration device that can reduce costs.

Solution to Problem

An anti-vibration device according to the present disclosure includes a tubular first attachment member configured to be connected to one of a vibration generating portion and a vibration receiving portion, a second attachment member configured to be connected to another one of the vibration generating portion and the vibration receiving portion, an elastic body connecting the first attachment member and the second attachment member to each other, and a separating member separating a liquid-filled liquid chamber inside the first attachment member into a main liquid chamber and a secondary liquid chamber, the main liquid chamber being partitioned by at least the elastic body and a membrane, and the secondary liquid chamber being partitioned by at least a diaphragm, wherein the membrane is held by the separating member, and the membrane and the diaphragm are formed integrally.

The anti-vibration device of the present disclosure can reduce costs.

In the anti-vibration device of the present disclosure, the diaphragm may be disposed further on an outer circumferential side than the membrane, and the secondary liquid chamber may be formed in an annular shape.

Space efficiency can thus be improved.

Advantageous Effect

The present disclosure can provide an anti-vibration device that can reduce costs.

DETAILED DESCRIPTION

The following illustrates and describes embodiments of the disclosed anti-vibration device with reference to drawings.

Figure 1:
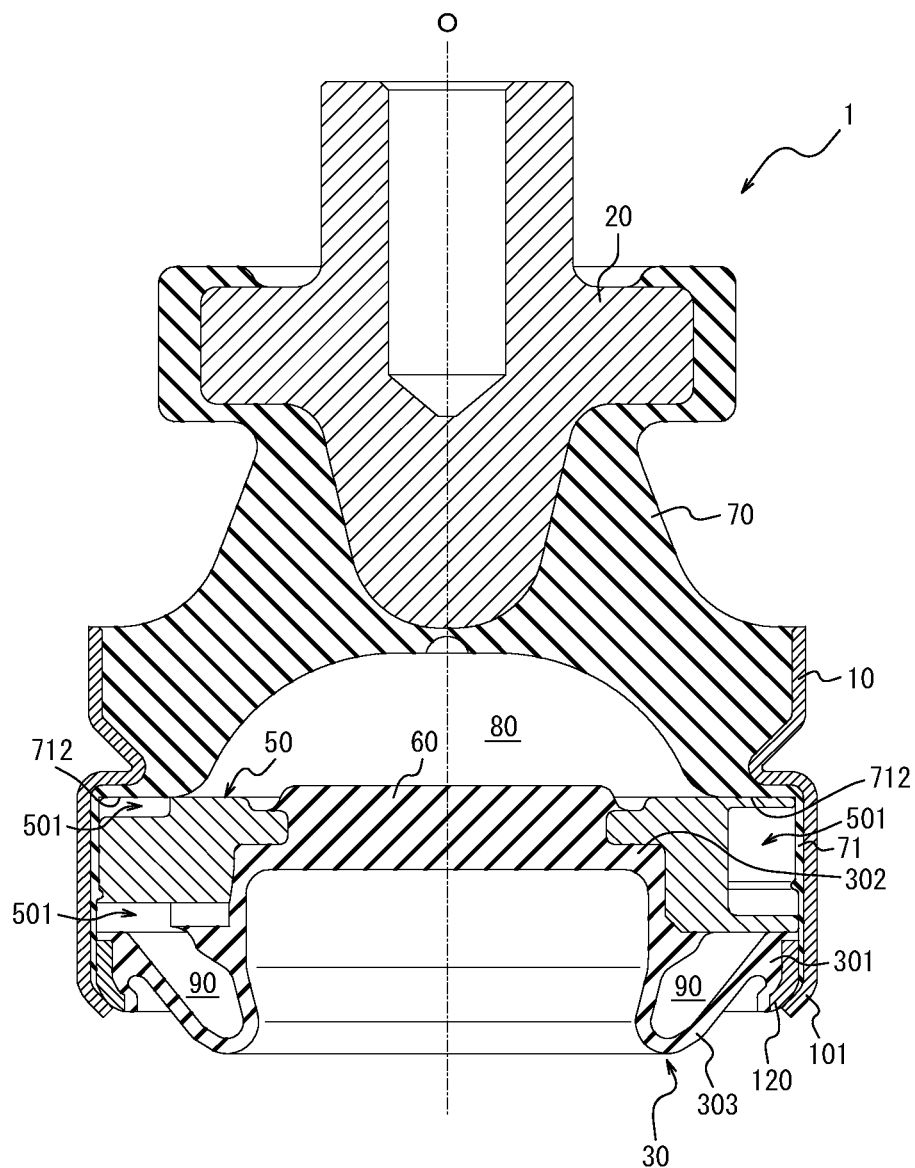
FIG. 1 is a cross-sectional diagram in the axial direction, illustrating an embodiment of an anti-vibration device of the present disclosure.
Figure 2:
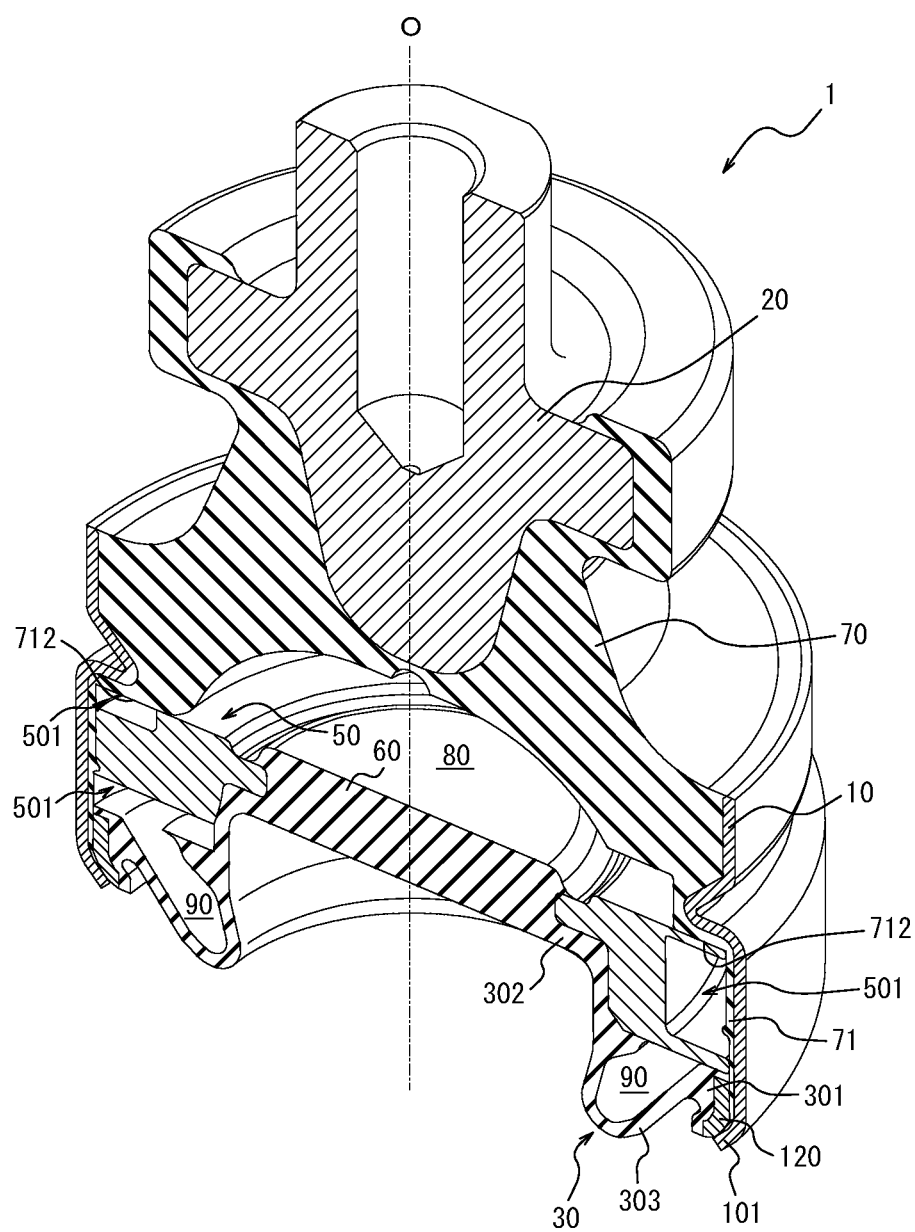
FIG. 2 is a partial cross-sectional perspective view illustrating a portion of the anti-vibration device in FIG. 1 with a cross-section in the axial direction.

FIG. 1 is a cross-sectional diagram in the axial direction of an anti-vibration device 1 according to an embodiment of the present disclosure. FIG. 2 is a partial cross-sectional perspective view illustrating a portion of the anti-vibration device 1 in FIG. 1 with a cross-section in the axial direction. The anti-vibration device 1 of this embodiment is configured as a liquid-filled type anti-vibration device and is suitably used as an engine mount of a vehicle or the like. The anti-vibration device 1 of this embodiment is configured to be connected between a vibration generating portion (engine or the like) and a vibration receiving portion (car body or the like) and functions to reduce transmission of vibration from the vibration generating portion to the vibration receiving portion.

The anti-vibration device 1 of this embodiment includes a first attachment member 10 that is tubular (substantially cylindrical in this example) and configured to be connected to one of the vibration generating portion and the vibration receiving portion, a second attachment member 20 configured to be connected to the other one of the vibration generating portion and the vibration receiving portion, an elastic body 70 connecting the first attachment member 10 and the second attachment member 20 to each other, and a separating member 50 that separates a liquid-filled liquid chamber inside the first attachment member 10 into a main liquid chamber 80 and a secondary liquid chamber 90. The main liquid chamber 80 is partitioned by at least the elastic body 70 and a membrane 60 and in this example is on one side in the axial direction (the upper side in FIG. 1; the same holds below). The secondary liquid chamber 90 is partitioned by at least a diaphragm 30 and in this example is on the other side in the axial direction (the lower side in FIG. 1: the same holds below). The membrane 60 and diaphragm 30 are made of elastic material, such as rubber, and are formed integrally.

The "axial direction of the anti-vibration device 1" refers to the direction along the central axis O of the first attachment member 10 (and therefore the central axis of the anti-vibration device 1). Furthermore, in the present disclosure, the area closer to the central axis O of the first attachment member 10 is referred to as the "inner circumferential side", and the area further from the central axis O is referred to as the "outer circumferential side".

In the example in the figures, the separating member 50 and the membrane 60 are disposed at the inner circumferential side of the first attachment member 10.

An incompressible liquid, such as ethylene glycol, water, or silicone oil, is enclosed in the liquid chamber that includes the main liquid chamber 80 and the secondary liquid chamber 90 inside the first attachment member 10.

In the example in the figures, the second attachment member 20 is shifted to the one side in the axial direction from the first attachment member 10. The outer surface of the elastic body 70 is formed as a substantially truncated cone protruding towards the one side in the axial direction, and the inner surface of the elastic body 70 (the surface at the other side in the axial direction) is recessed towards the one side in the axial direction. The elastic body 70 is fixed to a portion of the inner circumferential surface of the first attachment member 10 on the one side in the axial direction. The portion of the inner circumferential surface of the first attachment member 10 on the other side in the axial direction from the portion to which the elastic body 70 is attached is covered by a seal member 71 shaped as a thin film. The elastic body 70 and the seal member 71 are each formed from an elastic material, such as rubber. In this example, the elastic body 70 and the seal member 71 are formed integrally from the same material, but these components may be formed separately and may be formed from different materials.

In this example, a step 712 composed of the surface facing the other side in the axial direction is formed on the seal member 71, and the outer circumferential side end on the surface of the separating member 50 on the one side in the axial direction abuts the step 712.

The separating member 50 is constituted by plastic or another such resin material, aluminum alloy or another such metal, or the like. In the example in the figures, the separating member 50 is formed to be substantially annular. A spiral groove is formed on the outer circumferential surface of the separating member 50. This groove partially partitions an orifice passage 501.

The orifice passage 501 is partitioned by the groove formed on the outer circumferential surface of the separating member 50 and by the seal member 71 that blocks the opening of the groove on the outer circumferential side. The orifice passage 501 connects the main liquid chamber 80 and the secondary liquid chamber 90. The orifice passage 501 includes an opening, at one passage end, connecting to the main liquid chamber 80 on a surface on the one side in the axial direction of the separating member 50 and an opening, at the other passage end, connecting to the secondary liquid chamber 90 on a surface on the other side in the axial direction of the separating member 50. The orifice passage 501 extends spirally between these openings.

In this example, the membrane 60 is more rigid than the diaphragm 30 by being formed to be thicker than the diaphragm 30 (in particular, at least thicker than the below-described secondary liquid chamber partitioning portion 303 of the diaphragm 30). The membrane 60, however, needs to be at least somewhat deformable. The thickness (and therefore the rigidity) of the membrane 60 is adjusted in relation to the dimensions of the orifice passage 501 (cross-sectional area, length, and the like) so as to obtain the desired vibration absorption characteristics in the high-frequency range and/or vibration damping characteristics of the anti-vibration device 1.

The membrane 60 in this example is formed substantially in the shape of a disk and is held by the separating member 50. Here, "is held" by the separating member 50 refers to the membrane 60 being fixed to or engaged with the separating member 50 so that the membrane 60 does not completely dislodge from the separating member 50 even during vibration input (and therefore so that the membrane 60 faces the main liquid chamber 80 even during vibration input). In this example, in greater detail, the outer circumferential surface of the membrane 60 is fixed to the inner circumferential surface of the separating member 50 over the entire circumference by vulcanization adhesion. As a result, in a liquid-tight manner, the membrane 60 blocks a through hole partitioned by the inner circumferential surface of the separating member 50.

In this example, the main liquid chamber 80 is partitioned by the inner surface of the elastic body 70 (the surface on the other side in the axial direction), the surface on the one side in the axial direction of the separating member 50, and the surface on the one side in the axial direction of the membrane 60.

The diaphragm 30 extends annularly across the entire circumference around the central axis O. In this example, the diaphragm 30 includes an inner circumferential side fixed portion 302 positioned on the inner circumferential side in the diaphragm 30 and fixed to the separating member 50, an outer circumferential side fixed portion 301 positioned on the outer circumferential side in the diaphragm 30 and fixed to an annular metal fitting 120, and a secondary liquid chamber partitioning portion 303 that connects the inner circumferential side fixed portion 302 and the outer circumferential side fixed portion 301 and partially partitions the secondary liquid chamber 90. The inner circumferential side fixed portion 302 of the diaphragm 30 continues from the membrane 60 towards the outer circumferential side and is fixed by vulcanization adhesion to the inner circumferential surface of the separating member 50 and to the inner circumferential portion of the surface on the other side in the axial direction of the separating member 50. The surface on the outer circumferential side of the outer circumferential side fixed portion 301 of the diaphragm 30 is fixed by vulcanization adhesion to the inner circumferential surface, and to the surface on the one side in the axial direction, of the metal fitting 120. The surface of the outer circumferential side fixed portion 301 on the one side in the axial direction abuts the outer circumferential portion of the surface on the other side in the axial direction of the separating member 50. The secondary liquid chamber partitioning portion 303 extends between the inner circumferential side fixed portion 302 and the outer circumferential side fixed portion 301 in a substantial U shape projecting towards the other side in the axial direction in a cross-section along the central axis O.

The secondary liquid chamber 90 that extends in a substantially annular shape across the entire circumference around the central axis O is partitioned by the surface on the one side in the axial direction of the secondary liquid chamber partitioning portion 303 and by the portion of the surface, on the other side in the axial direction of the separating member 50, that is not in contact with the inner circumferential side fixed portion 302 or the outer circumferential side fixed portion 301.

As described above, the inner circumferential side fixed portion 302 of the diaphragm 30 connects the membrane 60 and the secondary liquid chamber partitioning portion 303 of the diaphragm 30 and is fixed to the separating member 50. Therefore, the membrane 60 and the secondary liquid chamber partitioning portion 303 of the diaphragm 30 are independently deformable.

In this example, an end 101 on the other side in the axial direction of the first attachment member 10 is positioned on the outer circumferential side of the metal fitting 120 and is fixed to the metal fitting 120 by being crimped so as to bend towards the inner circumferential side.

In this example, the end on the other side in the axial direction of the metal fitting 120 is bent towards the inner circumferential side. The end 101 on the other side in the axial direction of the first attachment member 10 is crimped towards the inner circumferential side so as to follow the bent shape of the metal fitting 120.

In the example in the figures, the diaphragm 30 and the membrane 60 block the open side on the other side in the axial direction of the first attachment member 10, and the surface on the other side in the axial direction of the diaphragm 30 and of the membrane 60 is exposed to the outside. Furthermore, in this example, the diaphragm 30 extends from the membrane 60 towards the other side in the axial direction and is disposed further on the outer circumferential side than the membrane 60. As a result, the other side in the axial direction relative to the membrane 60, and therefore the inner circumferential side relative to the diaphragm 30, is hollow.

This example is not limiting, and the open side on the other side in the axial direction of the first attachment member 10 may be blocked by a bottom wall member (not illustrated) formed integrally with or separately from the first attachment member 10, and this bottom wall member may cover the surface on the other side in the axial direction of the diaphragm 30 and the membrane 60.

In the anti-vibration device 1 configured in this way, when vibration from the vibration generating portion is input in the axial direction, the first attachment member 10 and the second attachment member 20 are relatively displaced in the axial direction, and while the main liquid chamber 80 and the secondary liquid chamber 90 expand and contract, liquid flows between the main liquid chamber 80 and the secondary liquid chamber 90 through the orifice passage 501. During this time, the input vibration is absorbed and damped by elastic deformation of the elastic body 70, liquid column resonance and flow path resistance of the liquid flowing through the orifice passage 501, and elastic deformation (vibration) of the membrane 60.

Figure 3:
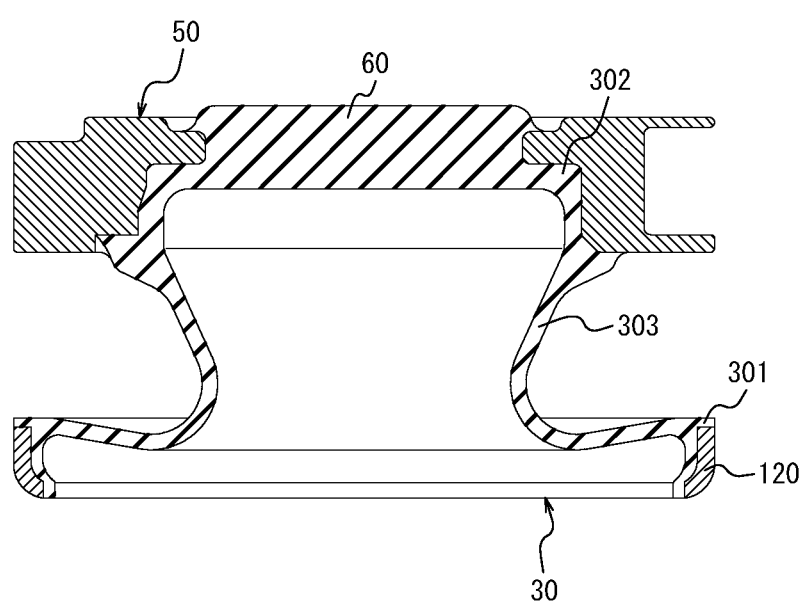
FIG. 3 illustrates an example of a method of manufacturing the anti-vibration device of FIG. 1.

When manufacturing the anti-vibration device 1 of this embodiment, for example, the first attachment member 10, second attachment member 20, elastic body 70, and seal member 71 are first integrally fixed to each other inside a mold by vulcanization adhesion. At this time, the end 101 on the other side in the axial direction of the first attachment member 10 extends in the axial direction. As illustrated in FIG. 3, inside a non-illustrated single mold, the separating member 50, membrane 60, diaphragm 30, and metal fitting 120 are also integrally fixed to each other by vulcanization adhesion. FIG. 3 is a cross-sectional diagram illustrating the separating member 50, membrane 60, diaphragm 30, and metal fitting 120 fixed to each other integrally.

The separating member 50, membrane 60, diaphragm 30, and metal fitting 120 fixed to each other integrally are then inserted inside the first attachment member 10 from the other side in the axial direction, and the separating member 50 is abutted against the step 712 formed on the seal member 71. The outer circumferential side fixed portion 301 of the diaphragm 30 is abutted against the surface on the other side in the axial direction of the separating member 50.

Subsequently, the first attachment member 10 is squeezed from the outer circumferential side to be reduced in diameter, and the end 101 on the other side in the axial direction of the first attachment member 10 is fixed to the metal fitting 120 by being crimped so as to bend towards the inner circumferential side.

According to the anti-vibration device 1 of this embodiment, since the membrane 60 and the diaphragm 30 are formed integrally, the membrane 60 and the diaphragm 30 can be formed integrally in one mold as one component when manufacturing the anti-vibration device 1. Consequently, costs can be reduced as compared to when the membrane 60 and the diaphragm 30 are formed separately.

Furthermore, in this example, the diaphragm 30 is further on the outer circumferential side than the membrane 60, and the secondary liquid chamber 90 is formed annularly, thereby forming a hollow on the inner circumferential side relative to the diaphragm 30 (the other side in the axial direction relative to the membrane 60). As a result, when the secondary liquid chamber 90 expands, the diaphragm 30 can deform towards the inner circumferential side that is hollow, yielding a corresponding reduction in deformation of the diaphragm 30 towards the other side in the axial direction. Space efficiency is thus improved.

In this example, the main liquid chamber 80 is partially partitioned by the surface of the membrane 60 on the one side in the axial direction (i.e. the membrane 60 faces the main liquid chamber 80). Therefore, when a relatively high frequency vibration (for example, vibration of approximately 100 Hz to 500 Hz) is input to the anti-vibration device 1, an efficient vibration absorption effect can be obtained at least by elastic deformation (vibration) of the membrane 60, even if the orifice passage 501 becomes clogged.

Apart from the above-described examples, a variety of modifications may be made to the anti-vibration device 1 in this embodiment.

For example, the first attachment member 10 may be constituted by a plurality of coaxial tubular members.

Furthermore, a second orifice passage may be formed from the separating member 50 to the membrane 60 and the inner circumferential side fixed portion 302 of the diaphragm 30 at least at a portion in the circumferential direction by providing a gap that connects the main liquid chamber 80 and the secondary liquid chamber 90.

The metal fitting 120 may be omitted, and the outer circumferential side fixed portion 301 of the diaphragm 30 may be fixed by being sandwiched between the separating member 50 and the first attachment member 10.

REFERENCE SIGNS LIST

1 Anti-vibration device
10 First attachment member
20 Second attachment member
30 Diaphragm
50 Separating member
60 Membrane
70 Elastic body
71 Seal member
80 Main liquid chamber
90 Secondary liquid chamber
101 End on other side in axial direction of first attachment member
120 Metal fitting

301 Fixed portion on outer circumferential side of diaphragm
302 Fixed portion on inner circumferential side of diaphragm
303 Secondary liquid chamber partitioning portion of diaphragm
501 Orifice passage
712 Step
O Central axis

The invention claimed is:

1. An anti-vibration device comprising:
a tubular first attachment member configured to be connected to one of a vibration generating portion and a vibration receiving portion;
a second attachment member configured to be connected to another one of the vibration generating portion and the vibration receiving portion;
an elastic body connecting the first attachment member and the second attachment member to each other; and
a separating member separating a liquid-filled liquid chamber inside the first attachment member into a main liquid chamber and a secondary liquid chamber, the main liquid chamber being bounded by at least the elastic body and a membrane, and the secondary liquid chamber being bounded by at least a diaphragm, wherein
the membrane is held by the separating member,
the membrane and the diaphragm are formed integrally and the membrane is thicker than the diaphragm,
the diaphragm is disposed further on an outer circumferential side than the membrane,
the membrane has a surface on an opposite side of the main liquid chamber that contacts air and the diaphragm has surface on an opposite side of the secondary liquid chamber that contacts air, and
the secondary liquid chamber is formed in an annular shape.

* * * * *